Oct. 13, 1970          I. SWIRE                3,533,590
DRINKING-GLASS HOLDER WITH CLAMP ATTACHABLE TO FOOD PLATE
Filed June 17, 1968                    2 Sheets-Sheet 2

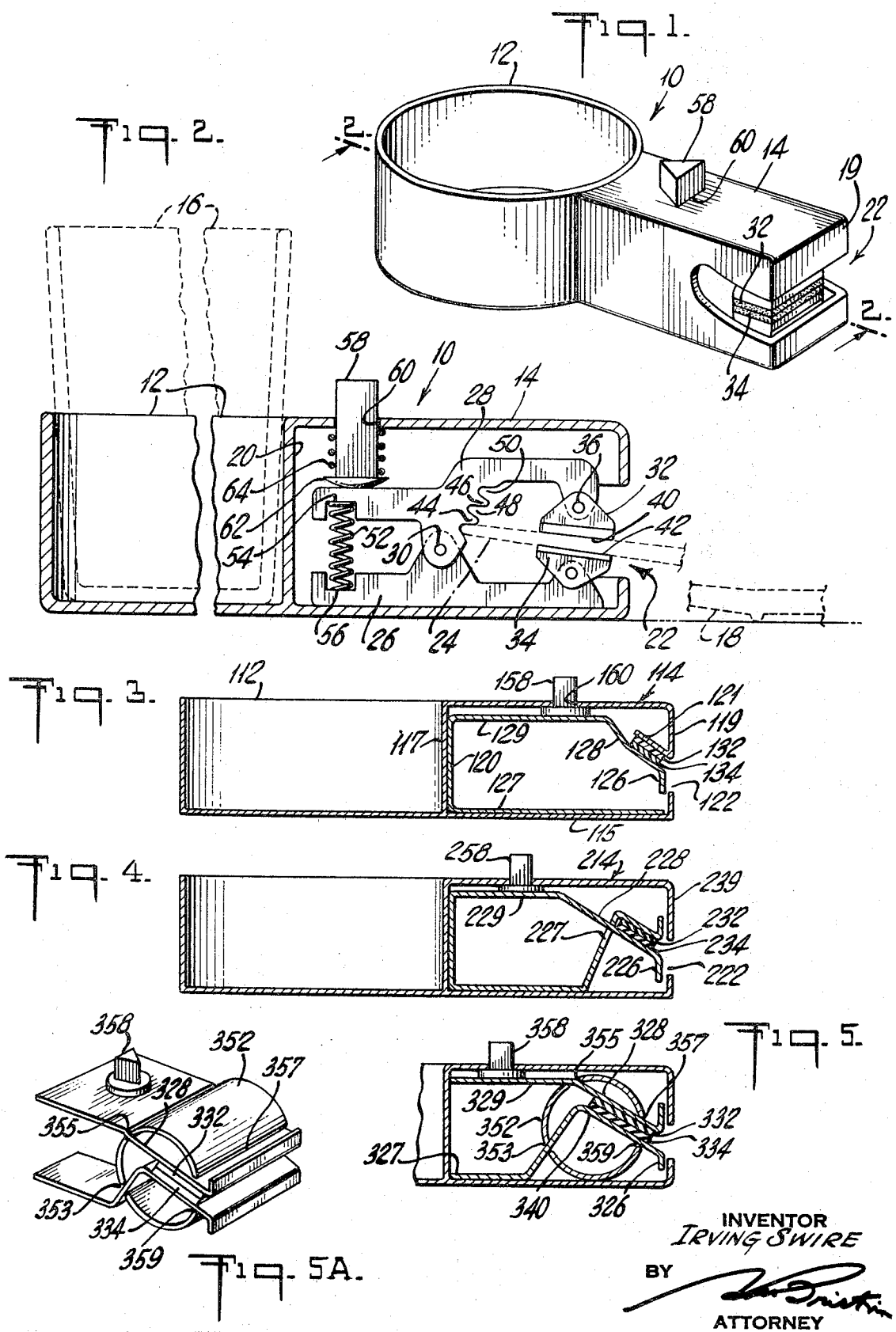

INVENTOR
IRVING SWIRE
BY
ATTORNEY

United States Patent Office 3,533,590
Patented Oct. 13, 1970

3,533,590
DRINKING-GLASS HOLDER WITH CLAMP
ATTACHABLE TO FOOD PLATE
Irving Swire, 244 Fountain Road,
Englewood, N.J. 07632
Filed June 17, 1968, Ser. No. 737,776
Int. Cl. A47k 1/09
U.S. Cl. 248—311                                    8 Claims

ABSTRACT OF THE DISCLOSURE

A device is disclosed for simultaneously supporting a drinking glass or cup and also a food plate. The device comprises a support body on which is mounted clamping means having opposed jaws for engaging opposite sides of the plate. Biasing means, such as a bent leaf spring, are mounted on the support body for urging the jaws together in a predetermined direction toward engaging position with respect to each other. Release means, such as a pushbutton, are provided for manually moving the jaws out of clamping position. A number of embodiments are disclosed, the preferred embodiments being one in which pivoted lever arms which support the plate-clamping jaws have teeth or serrations for accommodating between them the edges of food plates having edge-slopes at various angles.

BACKGROUND AND PRIOR ART

In the prior art there have been numerous devices known in which a cup or glass holder is clamped to a food plate. However, no devices have been found in the prior art which accommodate a plate as well as a drinking cup at the device, and none have been found in the prior art capable of accommodating plates of different edge-slope.

SUMMARY OF THE INVENTION

The invention relates to a drinking-glass holder with a clamp attachable to a food plate, and more particularly to a novel improvement in serving trays wherein a support body is provided for simultaneously supporting a drinking container as well as a food plate. The support body, in addition to providing a receptacle for receiving the drinking glass or cup, also has clamping means provided with opposed jaws for engaging opposite sides of the food plate. Biasing means in the form of a bent leaf spring, compression spring or tubular spring, are mounted on the support body within a handle member. One or more manual pushbuttons operate the jaws to open them to receive the edge of the food plate, and releasing the pushbutton means, located either at the top of the handle or at lateral sides of the handle, permits the clamping jaws to grip and retain the edge of the plate. For plates of varying edge slope, one of the embodiments provides a plurality of teeth or serrations and pivoted grippers to accommodate plates having various slopes of plate edges One of the primary objects of the invention is to provide a cup or glass confining member functionally integral with a plate holding device, the device being capable of being in one hand while being manipulated with the same hand to engage and disengage a food plate.

Other objects, advantages and features of the invention will become more apparent to those skilled in the art as the description proceeds with reference to the accompanying drawings illustrating various embodiments of the invention, in which:

FIG. 1 is a perspective view of a preferred embodiment of the invention;

FIG. 2 is a shortened longitudinal cross section taken in the direction of arrows 2–2 of FIG. 1;

FIG. 3 is a schematic longitudinal cross section taken through a modification of the device according to FIGS. 1 and 2;

FIG. 4 is a schematic longitudinal cross section of a second modification of the invention;

FIG. 5 is a fragmentary longitudinal cross section of a third modification of the invention;

FIG. 5A is a perspective view of a detail of the modification of FIG. 5;

Figure 6:
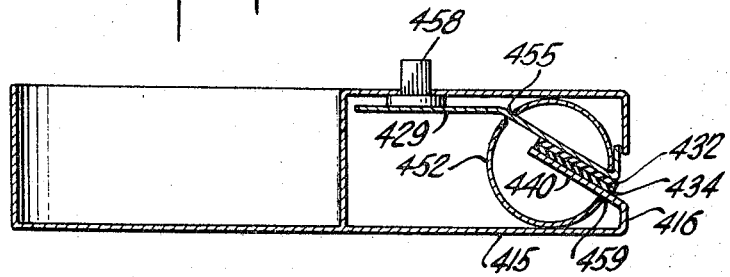
FIG. 6 is a longitudinal cross section of a fourth modification of the invention.

In the drawings, FIGS. 1 and 2 illustrate a preferred embodiment of the invention. A support body, indicated generally at 10, comprises a receptacle portion 12 and a handle portion 14. The receptacle portion 12 is adapted to receive a drinking glass or cup, indicated by phantom lines at 16; and the handle portion 14 is adapted to receive and clamp the edge of a food plate, indicated by phantom lines at 18. The handle member 14 is fixed to the glass receptacle portion 12 by having a common wall 20 integrally formed therewith, such as by plastic molding. The handle portion 14 is provided with a slot or opening 22 into which is received the edge 24 of the food plate 18. The plate edge 24 is usually sloping relative to the horizontal, but at varying degrees of inclination, depending upon the particular design of the plate 18.

A pair of lever arms 26, 28 mutually pivoted relative to each other by a pivot pin 30, carry on their respective outer ends a pair of gripper jaws 32, 34. The upper gripper member 32 is pivoted to lever arm 28 by a pivot pin 36, and the lower gripper jaw 34 is pivoted to the lower lever arm 26 by a pivot pin 38. The plate-engaging surfaces 40, 42 of the gripper jaws 32, 34 are preferably made of soft rubber or other pliable material which enhances the retaining friction of the gripper members 32, 34 against the plate with a minimum slippage as well as minimum tendency to scratch or mar the plate 18. The upper lever arm 28, in this embodiment, is provided with a plurality of sprocket-type teeth or serrations 44, 46 forming between them a plurality of indentations 48, 50 adapted to engage plate edges 24 having various degrees of inclination relative to the horizontal. The other ends of the pivoted lever arms 26, 28, i.e. the end closest to the wall 20, are provided with a compression spring 52 resting in respective recesses 54, 56 of the lever arms 28, 26. A pushbutton member 58 extends through an opening 60 in the upper surface of handle member 14. The button member 58 has, at its lower end, a rounded surface 62 which serves to press against the inner end of lever arm 28 to compress spring 52 in opposition to the button-return spring 64.

The embodiment of FIGS. 1 and 2 operates as follows. While holding the handle 14 of the device in the right hand, for example, the person's other hand is completely free to lift or carry the glass 16 and place it into the receptacle 12 for transporting, with the device, and then to lift the plate 18, with or without food, and insert it into the handle opening 22 to be gripped by the jaws 32, 34 while the thumb of the right hand manipulates the pushbutton 58 to open the jaws 32, 34 and then to close them by releasing the pushbutton 58 under return pressure of return spring 64 and compression spring 52. The pivots 36, 38 of the gripper jaw members 32, 34 permit the latter to swivel and adjust to various inclinations of the slope of the plate edge 24. Furthermore, selection of a respective recess or slot 48, 50 in the upper lever arm 28 permits a variable location for retaining the edge or rim of the plate 18 in a fixed safe position within the handle 14. To release the plate the release pushbutton member 58 is again pressed down manually with the same hand which holds the handle 14, and the plate 18 can then easily be withdrawn from between the gripper jaws 32, 34.

In the modification of FIG. 3, a simpler and less expensive construction is illustrated, utilizing the same basic concept of the invention as shown in the embodiment of FIGS. 1 and 2. To avoid unnecessary repetition and to simplify explanation, various functionally similar parts in the several views are designated by similar reference numerals but increased by the value of 100, 200, 300, etc. in the other modifications of FIGS. 4, 5, 6, 7, etc.

In FIG. 3, the biasing means for urging the gripper members 132, 134 against each other comprises a leaf spring member 126 bent into the shape as illustrated in FIG. 3 so that it has two respectively parallel sides 127, 129 connected by a vertical side 120. The bottom side 127 and the end 120 of the spring member 126 are respectively contiguous with the bottom 115 and the vertical wall 117 of the support body 114. In order to form the end opening 122 for receiving the food plate between the grippers 132, 134, the end face 119 of the support handle 114 is provided with a reverse angular bend 121 to provide a supporting surface for the upper gripper jaw 134 at approximately a 45 degree angle to the horizontal. The opposing bottom gripper jaw 134 is supported at a complementary angle by being affixed to a movable portion of release spring 126. The lower lip of opening 122 is formed by an up-turned portion of lower surface 115 of the handle member 114.

In operation, the modification of FIG. 3 acts in a manner somewhat similar to that of the embodiment of FIGS. 1 and 2. The hand supporting the handle member 114 can also manipulate the pushbutton 158 with the thumb thereof, causing the gripper members 132, 134 to move apart when the button 158 is depressed to permit the food plate to be inserted between the jaws, after which release of the bushbutton 158 causes the return spring action of leaf spring 126 to automatically return the pushbutton 158 upwardly through the hole 160 in the upper surface of handle member 114.

In the modification of FIG. 4, the lower gripper member 234 is supported on an extension arm 228 of the leaf spring 226 in a manner somewhat similar to the support of member 134 of FIG. 3, namely by an end portion of the leaf spring, except that the upper gripper member 232, instead of being supported by a reverse bend as at 121, is supported by a lower extension portion of spring 226 having an offset 227 so as to clear the other extension 228.

In operation, when the pushbutton 258 is manually depressed, the lower gripper member 234 is disengaged away from the upper gripper member 232 to permit insertion of a food plate through opening 222 and between the jaws of gripper members 232, 234. Release of the manual pressure on pushbutton 258 causes the upward urging of leaf spring portion 229 to press the pushbutton 258 back upwardly and to force the lower gripper member 234 upwardly, either against the bottom surface of the plate or, when there is no plate inserted, then against the bottom surface of the upper gripper member 232.

In the modification of FIG. 5, a tubular spring member 352 is provided having a plurality of longitudinal slots 353, 355, 357, 359 adapted to receive and serve in combination with the bent flat leaf spring 326. The tubular shaped leaf spring 352, since it tends to retain its tubular, cylindrical shape, resists any spreading apart of the upper and lower gripper members 332, 334, respectively retained between extension portions 328 and 329 of the leaf spring 326. The openings 353 and 355 extend only partially along the length of the tubular member 352, but the tubular member 352 is split completely along its length to define the edges 357, 359 which rest against and urge together the extension portions 328 and 329 of the bent flat leaf spring 326.

In operation, as best seen by referral to FIG. 5A, downward pressure on the pushbutton 358 is transmitted to upper leaf spring member 329 and tends to rotate the upper cover portion of the cylindrical spring member 352 in a counterclockwise direction, as viewed in FIGS. 5 and 5A, since the extension portion 328 of spring member 329 is retained in the slot 355 and extends through the longitudinal opening at 357. The lower leaf spring member 327, since it extends through the slot 353, the longitudinal edge of the slot at 359 retains the lower portion of the cylindrical spring member 352 in opposition to the force originating from downward pressure on button 358. Thus, the gripper jaws 332, 334 are opened as a result of pressure on button 358. On the other hand, release of the button 358 permits the tubular spring member 352 to close at 357, 359, to urge the gripper jaws 332, 334 back toward each other.

In the modification of FIG. 6, the biasing means comprises a tubular or cylindrical spring 452, somewhat similar to the cylindrical spring 352 of FIGS. 5, 5A, but here acting in combination with a single flat leaf spring member 429. The member 429 is joined, such as by welding, at 455 to the cylindrical spring member 452. The bottom member 415 of the support body is formed with a lower lip 416 and a backward slanted portion 440 to support the lower gripper member 434. The upper gripper member 432 is supported at the lower side of the bent flat spring member 429.

In operation, the modification of FIG. 6 operates as follows. Pressure on the pushbutton 458 depresses the flat spring member 429 to cause the upper portion of cylindrical spring member 452 to rotate counterclockwise, thus opening the gripper jaws 432, 434. The lower portion of the cylindrical spring member is retained in position by its edge 459 beneath and the reverse bend 440 of the lip 416.

Figure 7:
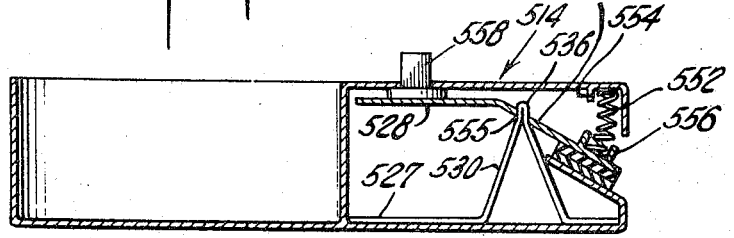
FIG. 7 is a longitudinal cross section of a fifth modification of the invention.

In the modification of FIG. 7, the biasing means comprises a compression spring 552 which tends to urge a pivoted lever 528 in a clockwise direction relative to its fulcrum 536. The fulcrum is formed by a slot 555 in the lever member 528 through which slot is inserted the pinched end-loop 536 of an inverted-V-shaped fulcrum supporting member 530 having flat supporting legs 527, 527. The compression spring 552 is laterally retained in position by a pair of end sockets, namely an upper socket 554 formed in the bottom surface of the upper wall of handle 514, and a lower pocket 556 formed on the upper surface of the extension of lever 528.

In operation of the device of FIG. 7, the pushbutton 558, when depressed, rotates the lever 528 in a counterclockwise direction about its fulcrum 536 in opposition to the compressive force of spring 552 which urges the lever 528 in a clockwise direction, urging the gripper jaws 532, 534 against each other in opposition to manual pressure on the pushbutton 558. Release of the pushbutton 558 permits the lever 528 to rotate in a clockwise direction under urging of spring 552 and to grip the food plate between jaws 532, 534, or to press the latter jaws against each other.

Figure 8:
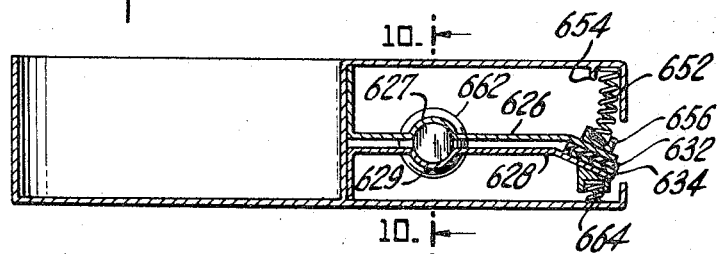
FIG. 8 is a longitudinal cross section of a sixth modification of the invention.
Figure 10:
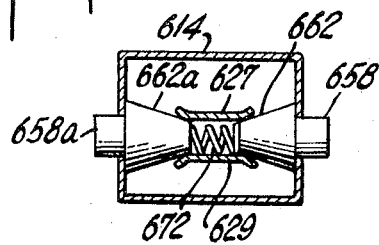
FIG. 10 is a transverse cross section taken in the direction of arrows 10–10 of FIG. 8.

In the modification of FIGS. 8 and 10, a pair of pushbuttons 658, 658a are located on opposite lateral sides of the handle member 614. The buttons 658, 658a are formed with conical or inclined extensions 662, 662a and are urged mutually apart by a compression spring 672 located between them. Engaging the inclined surfaces 662, 662a, so as to be moved in a direction at right angles to the axes of the pushbuttons 658, 658a, are spring or lever members 626, 628, formed at 627, 629 in a manner so as to engage and follow the inclined surfaces 662, 662a when the pushbuttons inclined move axially. Compression springs 652, 664 serve to press the gripper jaw member 632, 634 against each other and are retained in respective sockets in a manner similar to that described relative to sockets 554, 556 in connection with the modification of FIG. 7.

The device of FIG. 8 operates as follows. Manual pressure is simultaneously applied to both pushbuttons 658, 658a located on each lateral side of the handle 614. This tends to force the member portions 627, 629 apart and to open the jaws 632, 634 to admit a food plate between them. The compression action of springs 652, 664 urge the jaws 632, 634 together, and when manual pressure on the pushbuttons 658, 658a is released in opposition to the central compression spring 672. The spring 652, 664 serve to close the jaws onto the plate or against each other.

Figure 9:
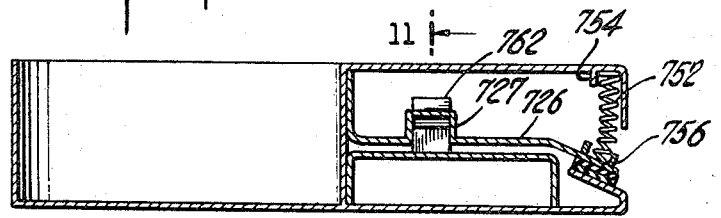
FIG. 9 is a longitudinal cross section of a seventh modification of the invention.
Figure 11:
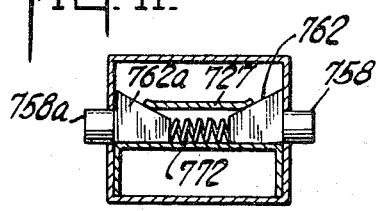
FIG. 11 is a transverse cross section taken in the direction of the arrows 11–11 of FIG. 9.

The modification of FIGS. 9 and 11 is somewhat similar to that of FIGS. 8 and 10, except that instead of a conical surfaces 662, 662a, inclined planes 762, 762a are provided at extensions of the lateral pushbuttons 758, 758a. The formed portion 727 of plate member 726 engages the inclined surface 762 and follows the latter as the pushbuttons 758, 758a move in or out in opposition to the compression spring 772. A single compression spring 752, having ends retained in sockets 754, 756 urges the outer end of flat spring member 726 downwardly so that the jaws 732, 734 are normally urged against each other, except when the two pushbuttons 758, 758a are pressed against each other.

It will be obvious to one skilled in the art, upon studying this disclosure, that other modifications and alterations are possible within the teachings of this disclosure, without departing from the spirit and scope of the invention as defined in the claims annexed hereto.

I claim:

1. A device for simultaneously supporting a drinking container and food plate comprising a support body having a receptacle for receiving and supporting the drinking container, clamping means having a pair of opposed jaws for engaging opposite sides of the plate, biasing means carried by said support body for urging said jaws into an engaging position with respect to each other, and means for moving at least one of said jaws away from the other jaw and out of said engaging position therewith, said support body comprising a handle member, said jaws and said biasing means being mounted within said handle member, means forming an end opening in said handle member for receiving a plate within said jaws, said jaws including a pair of mutually pivoted lever members, a pair of gripping members mounted on respective ends of said jaws adjacent said end opening, said biasing means including a spring member urging said lever members in a predetermined direction relative to each other, and a control and release member engageable with one of said lever ends for moving said gripper members toward and away from each other.

2. Device according to claim 1, said gripper members having individual pivot means to pivot same relative to their respective lever members, one of said lever members having a plurality of formed recesses for selectively receiving therein a sloping plate edge.

3. A device for simultaneously supporting a drinking container and food plate comprising a support body, clamping means having a pair of opposed jaws for engaging opposite sides of the plate, biasing means carried by said support body for urging said jaws into an engaging position with respect to each other, and means for moving at least one of said jaws away from the other jaw and out of said engaging position therewith, said biasing means including a first leaf spring member having two spaced parallel sides and a third side perpendicular to said two parallel sides and affixed to said support body, a second leaf spring member having two parallel side portions of which one portion thereof is spaced from and parallel with one of said parallel sides of said first spring member and a second portion of said second spring member is contiguous with the other of said two parallel sides, said means for moving at least one of said jaws comprising a pushbutton member extending through said first leaf member and engageable with said second spring member.

4. Device according to claim 3, said second leaf spring member having two extensions forming respective continuations of said parallel side portions, the lower one of said parallel side portions of said second leaf spring member having an extension forming an upper one of said jaws, the upper one of said parallel side portions of said second leaf spring member having an extension forming a lower one of said jaws.

5. Device according to claim 3, said first leaf spring member defining an angular extension of one of said parallel sides thereof, said angular extension carrying one of said jaws.

6. Device according to claim 3, said biasing means including a tubular leaf spring sleeve member affixed to both upper and lower portions of said leaf spring member.

7. A device for simultaneously supporting a drinking container and food plate comprising a support body, clamping means having a pair of opposed jaws for engaging opposite sides of the plate, biasing means carried by said support body for urging said jaws into an engaging position with respect to each other, and means for moving at least one of said jaws away from the other jaw and out of said engaging position therewith and a handle member mounting said jaws and said biasing means therein, said means for moving at least one of the jaws comprising a pair of opposed manual push members laterally disposed on opposite sides of said handle member, said push members having inclined surfaces engageable with said leaf spring members for moving said jaws transversely relative to the direction of manual pressure applied to the push members, said further biasing means for urging said push members outwardly from said handle member.

8. A device for simultaneously supporting a drinking container and food plate comprising a support body, clamping means having a pair of opposed jaws for engaging opposite sides of the plate, biasing means carried by said support body for urging said jaws into an engaging position with respect to each other, means for moving at least one of said jaws away from the other jaw and out of said engaging position therewith and a handle member mounting said jaws and said biasing means therein, said means for moving at least one of said jaws comprising pushbutton means defining an axis thereof, inclined surface means operable by said pushbutton means for movement in a direction parallel to said pushbutton axis, and means engageable with said inclined surface means for moving said jaws toward and away from each other.

References Cited

UNITED STATES PATENTS

| 2,464,880 | 3/1949 | McCombs | 248—226 |
| 2,539,935 | 1/1951 | Stephens et al. | 248—226 |
| 2,719,414 | 10/1955 | Davis | 248—311 X |

ROY D. FRAZIER, Primary Examiner

J. F. FOSS, Assistant Examiner

U.S. Cl. X.R.

211—71; 248—226